N. D. STURGES.
SEAL FOR BATTERIES.
APPLICATION FILED OCT. 24, 1919.
1,376,905.
Patented May 3, 1921.
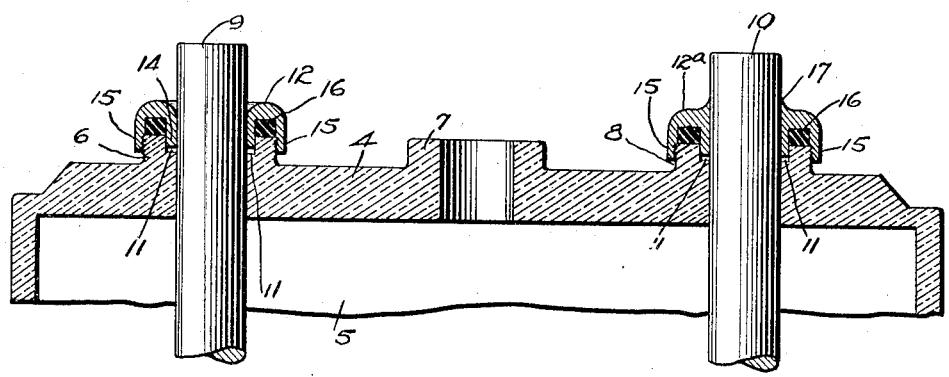
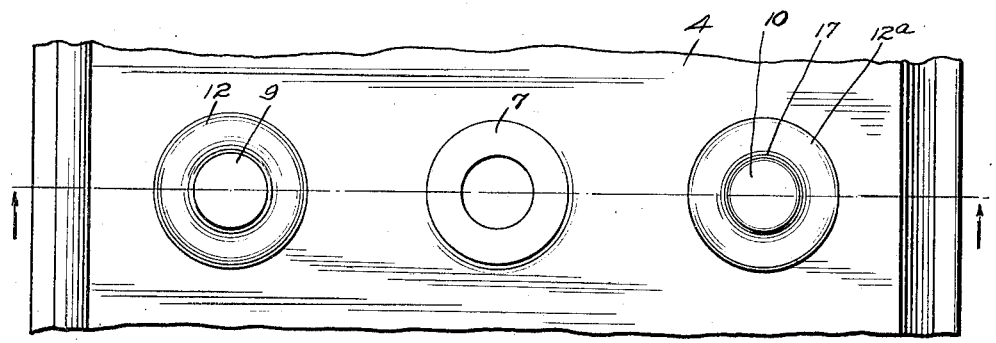
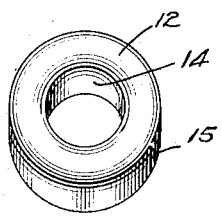
Inventor
Norman D. Sturges
By his Attorney
Walton Harrison ic
UNITED STATES PATENT OFFICE.

NORMAN D. STURGES, OF BELLEROSE, NEW YORK, ASSIGNOR TO MULTIPLE STORAGE BATTERY CO., A CORPORATION OF NEW YORK.

SEAL FOR BATTERIES.

1,376,905.  Specification of Letters Patent.  Patented May 3, 1921.

Original application filed April 24, 1918, Serial No. 230,434. Divided and this application filed October 24, 1919. Serial No. 333,015.

*To all whom it may concern:*

Be it known that I, NORMAN D. STURGES, a citizen of the United States, residing in Bellerose, county of Nassau, and State of New York, have invented certain new and useful Improvements in Seals for Batteries, of which the following is a full, clear, and exact description.

My invention relates to battery seals of a kind suitable for general use upon batteries of different types, but specially adapted for storage batteries.

The purpose of my invention is to enable a perfect seal to be made between the battery lid or cover and a terminal post or battery electrode extending through a hole therein.

This application is a division of my application filed April 24, 1918, Serial No. 230,434, for a battery seal.

It will be noted that in storage batteries, as now constructed, there are usually two terminal posts, each extending through a hole in the battery lid. In order to prevent the creep of acid or other battery fluid between the terminal post and the adjacent surface of the battery lid, and also to prevent the escape of gas from the battery, various kinds of seals have heretofore been employed.

The battery lid, or cover to which the seal is connected, is usually made of insulating material, preferably some composition having properties approximating those of hard rubber.

What I seek more particularly to do by my invention is to provide a simple joint between the battery terminal post and the battery cover, so arranged that the cover may easily be placed over the terminal post and then, by soldering or some equivalent operation, the terminal post may be effectively sealed to the battery cover or some member forming practically an integral part thereof.

Reference is made to the accompanying drawing forming a part of the specification, and in which like reference characters indicate like parts throughout the several figures.

Figure 1 is a central vertical section of a battery cover embodying one form of my invention, and is taken on the line 2—2 of Fig. 2, looking in the direction indicated by the arrows.

Fig. 2 is a fragmentary plan of the battery cover and parts mounted thereupon.

Fig. 3 is a perspective of my improved sealing ring, which when finally secured in position, is essentially a part of the battery cover.

The battery cover is shown at 4 and is made of composition having properties approximating those of hard rubber. This, of course, is insulating material.

The cover has a skirt for overhanging the outer edges of the battery jar, and is provided with necks 6, 7, 8, integral with it. The neck 7 is used for pouring battery fluid through the cover, and may be closed with a stopper or in any other convenient manner. The necks 6 and 8 are for the purpose of encircling a pair of terminal posts 9, 10.

Each of the two necks 6 and 8 is integral with the battery cover 4 and is made of composition of the kind above mentioned, that is, having properties approximating those of hard rubber. Each neck 6 and 8 is threaded externally, as shown, and is provided internally with a depression 11 of annular form so positioned and arranged that when the sealing rings are mounted in position and the terminal posts 9, 10 are in place each terminal post is encircled by an annular groove, as shown in Fig. 1.

My sealing ring is shown at 12, and appears detached and in perspective in Fig. 3. This ring, like the terminal posts, is made of zinc, lead, solder, or other metal which may be partially fused by the application of heat thereto by a soldering iron or by a gas flame commonly used for soldering, and which, when thus partially fused, readily makes a solder joint. This ring is provided with a pair of annular flanges 14, 15, integral with it and concentric to each other. The flange 14 is smooth outside and inside. The flange 15 is smooth inside, but threaded internally to fit the outer threaded surface of the neck 6 or 8.

A gasket 16, made of soft rubber and having the form of a flat ring, rests upon the upper surface of each of the two necks 6, 8, and is clamped firmly down thereupon by pressure of the ring. For this purpose the ring is screwed down tightly, so as to compress the gasket and thus make a fluid-tight fit, the inner flange 14 extending down into the annular groove 11, as shown in Fig. 1.

This done, the sealing ring is soldered directly to the terminal post, as shown at 17 in Fig. 1, the general form of the ring now being that indicated at 12ª.

As is well known in this art, terminal posts are practically always made of metal adapted to be soldered. Antimonial lead is appropriate for this purpose.

Thus the ring when in position but not soldered appears as indicated at 12, but when soldered has the appearance indicated at 12ª.

The soldering being completed, no acid or other battery fluid can find its way out of the battery by creeping upwardly along the surface of the terminal post. The liquid cannot pass the soldered joint just described, because at 17 the sealing ring is rendered integral with the terminal post. Neither can the liquid creep underneath the gasket or over the gasket, because of the resilience of the gasket and the pressure thereupon.

Thus the joint as a whole is liquid-tight, or even gas tight.

The sealing ring, having the proximate form shown in Fig. 3, may be made and sold separately as an article of manufacture.

Again, the battery cover adapted for carrying the sealing ring and either actually provided with the sealing ring or not, as desired, may also be treated as an article of manufacture.

I do not limit myself to the precise mechanism shown, as variations may be made therein without departing from the spirit of my invention, the scope of which is commensurate with my claims.

I claim:—

1. In a device of the character described, the combination of a battery cover, made of insulating material, and provided with a threaded neck, a terminal post made of metal and extending through said threaded neck, a gasket engaging said neck, and a sealing ring provided with a threaded neck portion for engaging said threaded neck of the battery cover, said sealing ring being provided with another portion engaging said gasket in order to compress said gasket, said sealing ring and said terminal post being connected integrally together by fusion.

2. As an article of manufacture, a sealing ring made of metal easily fusible and thus adapted for soldering said ring being provided with a pair of flanges integral with it and disposed concentrically to each other, one of said flanges being threaded.

3. As an article of manufacture, a battery cover made of insulating material and provided with a threaded neck, and a sealing ring provided with a threaded portion for engaging said threaded neck, said sealing ring being further provided with a portion carried by said neck and made of metal readily fusible and thus adapted to be soldered.

4. In a seal for batteries, the combination of a battery cover provided with a threaded portion serving as a neck, a terminal post made of metal and extending through said threaded portion, means coacting with said neck and said battery cover for preventing leakage therebetween, and a sealing ring provided with a threaded portion engaging said first mentioned threaded portion, said sealing ring being further provided with an integral connection with said terminal post.

5. In a seal for batteries the combination of a battery cover provided with a threaded neck, a gasket of resilient material carried by said neck, a terminal post extending through said neck and encircled by said gasket, and a sealing ring encircling said terminal post and secured integrally thereto by partial fusion therewith, said sealing ring being provided with a threaded flange in engagement with said threaded neck.

6. In a seal for batteries the combination of a battery cover provided with a threaded neck, a rubber gasket resting upon said neck, a sealing ring provided with a flange integral therewith and extending between said threaded neck and said gasket, said sealing ring being provided with a threaded flange engaging said threaded neck so as to clamp said rubber gasket upon said neck, and a terminal post extending through said neck and connected integrally with said sealing ring.

NORMAN D. STURGES.